United States Patent

[11] 3,625,867

| [72] | Inventors | Takachika Yoshino<br>80-3 Yamashitacho, NaKa-ku, Yokohama;<br>Shigeru Saito, 28 Harumicho-1-chome,<br>Fuchu-shi; Masukuni Sobukawa, 19,<br>Kametakada-4-chome, Nakano-ku, Tokyo;<br>Tadao Shizokuishi, 447-26, Nagatacho,<br>Minami-ku, Yokohama, all of Japan |
|---|---|---|
| [21] | Appl. No. | 740,849 |
| [22] | Filed | May 28, 1968 |
| [45] | Patented | Dec. 7, 1971 |
| [32] | Priority | June 2, 1967 |
| [33] | | Japan |
| [31] | | 42/34874 |

[54] PROCESS FOR PRODUCTION OF METAL OXIDE-ANTIMONY OXIDE CATALYSTS
13 Claims, No Drawings

[52] U.S. Cl. .................................................. 252/456,
252/464, 260/465.3
[51] Int. Cl. ..................................................... B01j 11/06
[50] Field of Search .............................................. 252/456,
464; 260/465.3

[56] References Cited
UNITED STATES PATENTS

| 3,014,899 | 12/1961 | Engel ............................ | 252/456 X |
| 3,200,081 | 8/1965 | Callahan et al. ............... | 252/456 X |
| 3,243,385 | 3/1966 | Sennewald et al. ............ | 252/456 X |
| 3,403,177 | 9/1968 | Brown ........................... | 252/456 X |

*Primary Examiner*—Daniel E. Wyman
*Assistant Examiner*—C. F. Dees
*Attorney*—Cushman, Darby and Cushman ABSTRACT: This invention provides an improved process for producing a metal oxide-antimony oxide catalyst, which comprises the steps of (a) heat treating an intimate mixture of the catalyst ingredients at a temperature of 200°–600° C. in the presence of a reducing gas or vapor having an electron donor character, said gas or vapor being present in an amount sufficient to make up a reducing atmosphere, (b) precalcining the resulting product at a temperature of 300°–600° C. in an oxidative atmosphere, and (c) calcining the precalcined product at a temperature of 800°–1,000° C. in an oxidative atmosphere. A precalcination and a final calcination similar to the steps (b) and (c), per se, are known; but the step (a) and the combination of steps (a), (b) and (c) are novel. The catalysts prepared by the present process are useful for oxidation and ammoxidation of olefins, and they exhibit an improved activity and an improved selectivity with respect to the objective product.

For example, iron (uranium or tin) oxide-antimony oxide catalyst supported on silica is prepared according to the present process wherein the step (a) is carried out by using $NH_3$ ($H_2$ or $C_3H_3$) with or without a diluent ($N_2$, etc.) at 350°–400° C., and the step (b) and (c) are carried out in an airstream at 400°–550° C. and at 900°–950° C., respectively. The resulting catalyst is used for ammoxidation of propylene to acrylonitrile, and it exhibits improved conversion of propylene to acrylonitrile ($\approx$71 percent) compared with the corresponding control catalyst not subjected to the step (a) treatment ($\approx$66 percent).

PROCESS FOR PRODUCTION OF METAL OXIDE-ANTIMONY OXIDE CATALYSTS

This invention relates to a process for the production of a metal oxide-antimony oxide catalyst, such as iron-antimony system and uranium-antimony system, and it is characterized in that the process includes a unique heat-treatment step.

It has already been well known to those skilled in the art that a catalyst containing antimony oxide as an effective ingredient is useful for the oxidation of olefins to corresponding aldehydes or diolefins and for the ammoxidation of olefins to corresponding nitriles. For instance, an iron (or cobalt or nickel)-antimony system, a uranium-antimony system, a tin-antimony system, a chromium (or copper, manganese or titanium)-antimony system and a manganese-antimony system are known to be useful catalysts for the oxidation and the ammoxidation of olefins, especially for the ammoxidation of propylene to acrylonitrile, and they are disclosed in Japanese Pat. No. 420,264 (filed on Dec. 30, 1960, and patented on Feb. 21, 1964), U.S. Pat. No. 3,197,419 (filed on Jan. 8, 1963 claiming the priorities of June 11, 1962 and Jan. 8, 1963 and patented on July 27, 1965), U.S. Pat. No. 3,198,750 (filed on Dec. 26, 1962 claiming the priorities of June 11 and Dec. 26, 1962 and patented on Aug. 3, 1965), U.S. Pat. No. 3,152,170 (filed on June 27, 1960 claiming the priority of July 1, 1959, and patented on Oct. 6, 1964), U.S. Pat. No. 3,200,081 (filed on Oct. 15, 1962 and patented on Aug. 10, 1965) and British Pat. No. 987,960 (filed on Apr. 30, 1963 and published on Mar. 31, 1965), respectively.

However, the matter to which particular attention should be directed concerning catalysts is that unlike simple chemical substances, the performance of catalysts cannot be simply and directly determined based only on constituents and proportions thereof. In other words, the physical properties and activities of catalysts can be greatly varied depending upon selection of starting materials, method of intermediate treatment, shaping conditions, heat-treating conditions, carriers and additives. Particularly, heat-treating conditions greatly affect the activity of catalyst.

The present inventors, based on their recognition of such facts, have done extensive research on such a method of heat treatment of a catalyst containing antimony oxide that the catalyst can most greatly demonstrate its ability, to accomplish the present invention.

As a method of heat treating such metal oxide catalysts, it has heretofore been conventional to calcine the catalysts at a high temperature in an oxidizing atmosphere, usually air, and research thereof has solely been directed to the determination of optimum calcination temperatures.

An object of the present invention is to provide a method of heat-treating catalyst ingredients in quite a new manner to enhance the activity of catalyst, whereby conventional methods have been improved.

Another object of the present invention is to provide a process for producing a catalyst characterized by heat treating an intimate mixture of catalyst ingredients in the presence of a reducing gas or vapor having an electron donor character, prior to the precalcination of said mixture in an oxidizing atmosphere in a conventional manner.

According to the present invention, there is provided a process for producing a metal oxide-antimony oxide catalyst which comprises subjecting an intimate mixture of the catalyst ingredients to precalcination at a temperature of 300° to 600° C. and then to final calcination at a temperature of 800° to 1,000° C. in the presence of an oxygen-containing gas in an amount sufficient to make up an oxidative atmosphere, characterized in that, prior to the precalcination, said intimate mixture is subjected to heat treatment at a temperature of 200° to 600° C. in the presence of a reducing gas or vapor having an electron donor character, said reducing gas or vapor being present in an amount sufficient to make up a reducing atmosphere.

Said metal oxide may be any polyvalent metal oxide which has already been known to be an effective ingredient for combining with antimony oxide to form a useful oxidation catalyst. For instance, such a polyvalent metal element may be iron, cobalt, nickel, uranium, tin, chromium, copper, manganese, titanium, vanadium, molybdenum, tungsten, cerium and thorium. Among these, iron, tin and uranium are particularly important, for the above-mentioned purpose. The oxidation reaction in the presence of said metal oxide-antimony oxide catalyst includes oxidation of $\alpha$, $\beta$-unsaturated olefins into corresponding aldehydes, oxidative dehydrogenation of olefins into diolefins and ammoxidation of $\alpha$, $\beta$-unsaturated olefins into corresponding nitriles.

The process of the present invention is effectively applicable to both catalysts supported and unsupported on a carrier. The carrier may be silica, alumina, zirconia, silica-alumina, silicon carbide, Alundum, inorganic silicates, etc. The process of the present invention is also effectively applicable to both catalysts promoted and unpromoted by adding a third ingredient known to be effective as a promoter. Such a promoter, i.e., the third element, may be an oxide of an element selected from the group consisting of Cu, Ag, Be, Mg, Ca, Sr, Ba, Zn, Cd, Hg, B, Ga, Ti, Zr, Ge, Sn, Pb, V, Nb, P, As, Bi, Cr, Mo, W, Se, Te, Mn, Re, Fe, Co, Ni, Ru, Rh, Pd, Ce, Th and U. Among them, B, Sn, V, P, Bi, Mo, W, Te, Fe and U are preferable elements for the above-mentioned purpose.

The term "reducing gas or vapor having an electron donor character" used herein refers to ammonia, hydrazine, hydroxylamine, aliphatic amines, aromatic amines, heterocyclic nitrogen compounds (for example, pyridines, quinolines), hydrogen, carbon monoxide, and unsaturated hydrocarbon gases, such as ethylene, propylene, isobutylene. For economical reasons and in view of simplification of operation, ammonia, hydrogen and propylene are preferably used among said gases.

Said gases or vapors may be used alone or in admixture of two or more. Further, said gases or vapors may be employed in admixture with a diluent selected from the group consisting of $N_2$, He, Ar, $H_2O$, $CO_2$ and saturated hydrocarbons (methane, ethane, propane, butane, etc.).

The reducing gas or vapor having an electron donor character may also be incorporated with air or oxygen in an amount such that the reducing atmosphere is not lost, said amount being such that even when the whole incorporated oxygen is reacted with the reducing gas or vapor, a substantial amount of the reducing gas or vapor still remains.

The heat treatment in the presence of the reducing gas or vapor having an electron donor character must be carried out at a temperature of 200° to 600° C. At a temperature lower than 200° C., the effect is very low, and at a temperature higher than 600° C., antimony oxide is strongly reduced into $Sb_2O_3$ or Sb which is separated or sublimated from the catalyst composition, whereby the composition of catalyst is changed. In view of safe control of temperature, the upper limit temperature is preferably 550° C. Further, it is preferable that the heat treatment be carried out in the presence of the reducing gas or vapor including at least one of the inert gases even in the course of elevation of the temperature to 200° C.

The time required to render effective the heat treatment in the presence of a reducing gas or vapor having an electron donor character, depends upon the treatment temperature, and it is generally longer at a treatment with a lower temperature range of 200° to 300° C. and shorter in a higher temperature range of 500° to 600° C., and intermediate at about 400° C. However, the time may be varied depending upon the composition of catalyst, the kind of gas or vapor, the concentration of gas or vapor, the temperature elevation velocity and the like, and hence a particular value cannot be previously determined. However, the optimum conditions can experimentally be determined from the results of the activity test of the catalysts treated according to the present process. Since heating beyond the necessary time does not cause a particular harm as far as the temperature is within said range, heating for a sufficient time is preferred for safety.

The catalyst subjected to the heat treatment at a temperature of 200° to 600° C. in the presence of a reducing gas or vapor having an electron donor character, is then subjected to precalcination at a temperature of 300° to 600° C. in the presence of oxygen. The precalcination may be effected in a separate furnace or the same furnace as that for the above-mentioned heat treatment. In the latter case, care should be taken so that the composition of a gas mixture formed in the furnace during the change of feed gas does not fall within the explosion region. The oxygen-containing gas is not necessarily pure oxygen, and air is most preferable from an economical viewpoint. The precalcination aims at converting the constituents of the catalyst into oxides which are stable at the precalcination temperature and completely volatilizing or decomposing the impurities incorporated in the preparation of catalyst ingredients, for example, $H_2O$, $CO_2$, ammonium chloride, ammonium nitrate and the like. Therefore, the precalcination may be effected in such an oxidizing atmosphere for such a period of time as to satisfy the above-mentioned purposes. The precalcination may be effected in the same manner as in a conventional method of producing a catalyst.

The precalcined catalyst is subjected to final calcination at a temperature of 800° to 1,000° C. in the presence of an oxygen-containing gas. The final calcination may be carried out by elevating the furnace temperature subsequently to the precalcination in the same furnace or may be effected in a separate furnace under the necessary conditions.

Although the final calcination temperature greatly affects the activity and selectivity of the catalyst, the optimum temperature may be varied depending upon the composition of catalyst, the starting reactants and the desired products, and hence it must experimentally be determined within the range of 800° to 1,000° C. However, when the optimum final calcination temperature has already been known for a catalyst which has not been subjected to the heat treatment in the presence of a reducing gas or vapor having an electron donor character which is the key point of the present invention, temperatures same as or near said optimum temperature may be used in the present final calcination.

The catalyst produced by the present process is superior to that by a conventional method with respect to activity, selectivity and conversion into desired products.

The reasons why the present catalyst has such characteristics and why the present process is particularly effective to a catalyst containing antimony oxide have not been theoretically sufficiently clarified. However, based on the phenomena observed in the production of a metal oxide-antimony oxide catalyst, the following can be submitted: In the course of the heat treatment at a temperature of 200° to 600° C. for the production of a metal oxide-antimony oxide catalyst in which antimony oxide and another metal oxide, for instance, iron oxide or uranium oxide, are finally intimately associated with each other, a thermal decomposition of each metal oxide and a solid reaction between the oxides are caused. The presence of a reducing gas or vapor having an electron donor character in said heat treatment results in controlling the thermal decomposition of each metal oxide and affects the solid phase reaction mechanism between the metal oxide and antimony oxide and the solid phase reaction velocity, for example, controlling the transfer of lattice oxygen and the crystal growth, whereby the degree of interaction between the catalyst-constituting metal oxides, which interaction has an intimate relation to catalyst activity, and the number of lattice defects are both greatly enhanced as compared with the case of heat treatment in an oxidizing gas. This is supported by the fact that the comparison of the catalyst obtained by the present process with a control catalyst obtained by conducting conventional precalcination and final calcination under the same conditions as those in the present process without carrying out the present heat treatment, indicates that (1) the present catalyst has a lower degree of crystallization according to X-ray diffraction, (2) the present catalyst has the increased number of electron defects according to gas absorption experiment, and (3) the present catalyst has a lower temperature of reductive separation of $Sb_2O_3$ from the catalyst in an reducing gas. Said fact proves that the degree of interaction between antimony oxide and another metal oxide is increased by the present heat treatment and the present process is commonly effective to antimony oxide-containing catalysts. In addition, differences in physical properties, such as surface area, pore distribution and the like are clearly seen between the present catalyst and the control catalyst.

The form of the starting materials for producing a catalyst by the present process is not critical. Elementary metals, oxides, hydroxides, nitrates, sulfates, hydrochlorides and organic acid salts may be used. When these materials are treated in a conventional manner, no particular treatment for applying the present process thereto is required.

The present invention is further explained by the following examples which are by way of illustration and not by way of limitation, in which examples, the catalyst activity test was made concerning the production of acrylonitrile from propylene, ammonia and oxygen according to the following manner: 50 ml. of a catalyst shaped to a cylinder of 2 mm. × 2 mm. Φ was charged in a U-shaped steel pipe having an inside diameter of 16 mm., which was then heated with a nitre consisting of sodium nitrite and potassium nitrate in equal amounts. A gas consisting of 8.0 percent by volume of propylene, 9.3 percent by volume of ammonia and 82.7 percent by volume of air was passed through said reaction vessel at a rate of 10 l./nr. The reaction was effected for several hours at each reaction temperature which was varied by varying the nitre temperature. The reaction gas was sampled and subjected to gas chromatography. On each catalyst, the optimum temperature at which the conversion of propylene into acrylonitrile became maximum, and the conversion and selectivity at that temperature were determined. In the examples, the following definitions of conversion and selectivity are applied:

Total conversion of propylene (%)
$$= \frac{\text{The carbon weight of reacted propylene}}{\text{The carbon weight of fed propylene}} \times 100$$

Selectivity of acrylonitrile (%)
$$= \frac{\text{The carbon weight of produced acrylonitrile}}{\text{The carbon weight of reacted propylene}} \times 100$$

Conversion of propylene to acrylonitrile (%)
$$= \frac{\text{The carbon weight of produced acrylonitrile}}{\text{The carbon weight of fed propylene}} \times 100$$

EXAMPLE 1

An iron oxide-antimony oxide catalyst supported on silica having a Fe:Sb:Si atomic ratio of 10:25:50 was prepared as follows:

1. Three liters of water was added to 114 g. of antimony trichloride, and the resulting mixture was well agitated and then allowed to stand to form a precipitate of antimony oxychloride. The precipitate was filtered off, washed with 200 ml. of water two times and then suspended in 1 l. of water.

Separately, 11.2 g. of electrolytic iron powder was gradually added to a mixed solution of 81 ml. of nitric acid (specific gravity: 1.38) and 100 ml. of water to completely dissolve the former in the latter.

The thus prepared two materials were mixed together with 300 g. of silica sol($SiO_2$: 20 percent by weight) and then boiled while being well stirred to dryness. The dried material was ground and then wet-mixed to form cylindrical pellets of 2 mm. × 2 mm. Φ.

2. The thus obtained pellets were heated in an ammonia stream to elevate the temperature from room temperature to 380° C. in 3 hrs., at which the pellets were maintained for 3 hrs. The pellets were then precalcined at 400° C. for 2 hrs. in an airstream and then at 550° C. for 2 hrs. in the same stream. Finally, the pellets were calcined at 900° C. for 2 hrs.

The results of the test on the thus obtained catalyst were as follows:

| | |
|---|---|
| The optimum reaction temperature: | 450° C. |
| (1) total conversion of propylene: | 91.5% |
| The selectivity of acrylonitrile: | 77.0% |
| The conversion of propylene to acrylonitrile: | 70.8% |

Comparative Example 1

Catalyst pellets which were prepared in the same manner as in the (1) step of example 1 and which were in a state as wet-mixed, were subjected to temperature elevation from room temperature to 400° C. in 3 hrs. in an airstream, then to precalcination at 550° C. for 2 hrs. and to final calcination at 900° C. for 2 hrs. in the same stream.

The results of the test on the thus obtained catalyst were as follows:

| | |
|---|---|
| The optimum reaction temperature: | 450° C. |
| The total conversion of propylene: | 85.0% |
| The selectivity of acrylonitrile: | 78.0% |
| The conversion of propylene to acrylonitrile: | 66.3% |

EXAMPLE 2

An iron oxide-antimony oxide catalyst supported on silica having a Fe:Sb:Si atomic ratio of 10:25:50 was prepared as follows:

1. 61 g. of metallic antimony powder was gradually added to 270 ml. of heated nitric acid (specific gravity: 1.38) to completely oxidize the metallic antimony. After the generation of a brown gas was stopped, the powder was allowed to stand at room temperature for 16 hrs., after which the excess nitric acid was removed, and then the resulting antimony oxide precipitate was washed with 100 ml. of water three times.

Separately, 11.2 g. of electrolytic iron powder was gradually added to a heated mixed solution consisting of 81 ml. of nitric acid (specific gravity: 1.38) and 100 ml. of water to completely dissolve the former in the latter.

The thus obtained two materials were mixed together with 300 g. of silica sol($SiO_2$: 20 percent by weight), and then aqueous ammonia (28 percent) was portionwise added to the resulting mixture, while stirring the latter, to adjust the pH thereof to 4. The resulting mixture was heated while being stirred to dryness. The dried material was ground and wet-mixed to form 2 mm. × 2 mm. Φ cylindrical pellets.

2. The thus obtained pellets were heated in an ammonia stream accompanied by nitrogen ($N_2$ partial pressure: 450 mm. Hg) to elevate the temperature from room temperature to 390° C. in 3 hrs., and maintained at that temperature for 6 hrs. The pellets were then precalcined at 400° C. for 2 hrs. and then at 550° C. for 2 hrs. in an airstream, and finally calcined at 900° C. for 2 hrs.

The results of the test on the thus obtained catalyst were as follows:

| | |
|---|---|
| The optimum reaction temperature: | 440° C. |
| The total conversion of propylene: | 95.3% |
| The selectivity of acrylonitrile: | 74.6% |
| The conversion of propylene to acrylonitrile: | 71.2% |

Comparative Example 2

Catalyst pellets prepared in the same manner as in the (1) step of example 2 which were in a state as wet-mixed were heated in an airstream to elevate the temperature to 400° C. in 3 hrs., and then subjected to precalcination at 400° C. for 2 hrs. and 550° C. for 2 hrs. and then to final calcination at 900° C. for 2 hrs., both in an airstream.

The results of the test on the thus obtained catalyst were as follows:

| | |
|---|---|
| The optimum reaction temperature: | 440° C. |
| The total conversion of propylene: | 90.4% |
| The selectivity of acrylonitrile: | 74.9% |
| The conversion of propylene to acrylonitrile: | 66.8% |

EXAMPLE 3

Catalyst pellets prepared in the same manner as in the (1) step of example 2 which were in a state as wet-mixed were heated in a propylene stream to elevate the temperature from room temperature to 370° C. in 4 hrs. and maintained at that temperature for 3 hrs. The pellets were then precalcined at 400° C. for 2 hrs. and then at 550° C. for 2 hrs. in an airstream and finally calcined at 900° C. for 2 hrs. in the same stream.

The results of the test on the thus obtained catalyst were as follows:

| | |
|---|---|
| The optimum reaction temperature: | 440° C. |
| The total conversion of propylene: | 94.2% |
| The selectivity of acrylonitrile: | 74.0% |
| The conversion of propylene to acrylonitrile: | 69.7% |

EXAMPLE 4

A uranium oxide-antimony oxide catalyst supported on silica having a U:Sb:Si atomic ratio of 1:4. 6:7 was prepared as follows:

1. 45 g. of metallic antimony powder was portionwise added to 180 ml. of heated conc. nitric acid (specific gravity: 1.38) and then heated until the generation of $NO_2$ was stopped. Water was almost completely vaporized from said powder while stirring the mixture, and then 34.4 g. of uranyl acetate was added thereto. The resulting mixture was milled with a mill for 4 hrs. and then thoroughly mixed with 50 ml. of water, 171 g. of silica sol($SiO_2$: 20 percent by weight) and 104 ml. of aqueous ammonia (28 percent). The resulting mixture was subjected to filtration and the resulting precipitate was washed with 200 ml. of water three times. The washed precipitate was dried in a drier at 130° C. for 16 hrs., after which the precipitate was wet-mixed to form 2 mm. × 2 mm. Φ cylindrical pellets.

2 The thus obtained pellets were heated in an ammonia stream accompanied by $N_2$ ($N_2$ partial pressure: 300 mm. Hg) to elevate the temperature from room temperature to 420° C. in 4 hrs. and then maintained at that temperature for 5 hrs. The pellets were precalcined at 550° C. for 2 hrs. in an airstream and the finally calcined at 950° C. for 2 hrs. in the same stream.

The results of the test on the thus obtained catalyst were as follows:

| | |
|---|---|
| The optimum reaction temperature: | 400° C. |
| The total conversion of propylene: | 91.0% |
| The selectivity of acrylonitrile: | 70.1% |
| The conversion of propylene to acrylonitrile: | 63.0% |

Comparative Example 3

Catalyst pellets prepared in the same manner as in the step (1) of example 4 which were in a state as wet-mixed were heated in an airstream to elevate the temperature from room temperature to 420° C. in 4 hrs., and then subjected to precalcination at 420° C. for 5 hrs. and at 550° C. for 2 hrs. and thereafter to final calcination at 950° C. for 2 hrs. in the same stream.

The results of the test on the thus obtained catalyst were as follows:

| | |
|---|---|
| The optimum reaction temperature: | 400° C. |
| The total conversion of propylene: | 85.0% |
| The selectivity of acrylonitrile: | 68.0% |
| The conversion of propylene to acrylonitrile: | 57.8% |

We claim:

1. A process for the production of a metal oxide-antimony oxide catalyst, which comprises subjecting an intimate mixture of the catalyst ingredients to precalcination at a temperature of 300° to 600° C. and then to final calcination at a temperature of 800° to 1,000° C. in the presence of an oxygen-containing gas in an amount sufficient to make up an oxidative atmosphere, the metal element of said metal oxide being a member selected from the group consisting of iron, cobalt, nickel, uranium, tin, chromium, copper, manganese, titanium, vanadium, molybdenum, tungsten, cerium and thorium, characterized in that prior to the precalcination, said intimate mixture is subjected to a heat treatment at a temperature of 200° to 600° C. in the presence of a member selected from the group consisting of ammonia, hydrogen, carbon monoxide and unsaturated hydrocarbons of two to four carbon atoms in an amount sufficient to make up a reducing atmosphere.

2. A process according to claim 1, wherein said intimate mixture for the catalyst composition includes a third ingredient as a promotor, said third ingredient being an oxide of an element selected from the group consisting of boron, tin, vanadium, phosphorus, bismuth, molybdenum, tungsten, tellurium, iron and uranium with the proviso that the promotor oxide is different than said metal oxide.

3. A process according to claim 1, wherein said catalyst is supported on a carrier selected from the group consisting of silica, alumina, zirconia, silica-alumina, silicon carbide, Alundum and inorganic silicates.

4. A process according to claim 1, wherein the unsaturated hydrocarbons are ethylene, propylene and isobutylene.

5. A process according to claim 1, wherein said reducing gas or vapor is used in admixture with an inert diluent selected from the group consisting of nitrogen, helium, argon, water vapor, carbon dioxide and saturated hydrocarbons.

6. A process according to claim 9, wherein the saturated hydrocarbons are methane, ethane, propane and butane.

7. A process according to claim 1, wherein said reducing gas or vapor is used in admixture with oxygen or air in an amount such as not to damage the reducing atmosphere.

8. A process for the production of a metal oxide-antimony oxide catalyst supported on silica, the metal element of said metal oxide being selected from the group consisting of iron, uranium and tin, which comprises subjecting an intimate mixture of the catalyst ingredients to precalcination at a temperature of 300° to 600° C. and then to final calcination at a temperature of 800° to 1,000° C. in the presence of an oxygen-containing gas in an amount sufficient to make up an oxidative atmosphere, characterized in that prior to the precalcination, said intimate mixture is subjected to heat treatment at a temperature of 200° to 600° C. in the presence of a reducing gas selected from the group consisting of ammonia, hydrogen and propylene, said reducing gas being present in an amount sufficient to make up a reducing atmosphere.

9. A process according to claim 8, wherein said intimate mixture for the catalyst composition includes a third ingredient known to be effective as a promotor, which third ingredient is an oxide of an element selected from the group consisting of boron, tin, vanadium, phosphorus, bismuth, molybdenum, tungsten, tellurium, iron and uranium with the proviso that the said promotor oxide is different than the said metal oxides.

10. A process according to claim 8, wherein said reducing gas or vapor is used in admixture with an inert diluent selected from the group consisting of nitrogen, helium, argon, water vapor, carbon dioxide and saturated hydrocarbons.

11. A process according to claim 10, wherein the saturated hydrocarbons are methane, ethane, propane and butane.

12. A process according to claim 8, wherein the reducing gas is used in admixture with oxygen or air in an amount such as not to damage the reducing atmosphere.

13. An oxidation catalyst prepared by a process as claimed in claim 1.

* * * * *

UNITED STATES PATENT OFFICE
CERTIFICATE OF CORRECTION

Patent No. 3,625,867                    Dated December 7, 1971

Inventor(s) Takachika YOSHINO; Shigeru SAITO; Masukuni SOBUKAWA and Tadao SHIZUKIUSHI It is certified that error appears in the above-identified patent and that said Letters Patent are hereby corrected as shown below:

Item 73 is omitted.

Item 73 should read --Nitto Chemical Industry Co., Ltd.--.

In Item 72, the last name of the fourth inventor should be changed from "Shizokuishi" to --Shizukuishi--.

Signed and sealed this 18th day of July 1972.

(SEAL)
Attest:

EDWARD M. FLETCHER, JR.       ROBERT GOTTSCHALK
Attesting Officer       Commissioner of Patents